United States Patent
Setoguchi (10) Patent No.: US 12,454,289 B2
(45) Date of Patent: Oct. 28, 2025

(54) VEHICLE CONTROL DEVICE, VEHICLE CONTROL METHOD, VEHICLE CONTROL PROGRAM, AND VEHICLE CONTROL SYSTEM

(71) Applicants: Nissan Motor Co., Ltd., Yokohama (JP); AMPERE S.A.S., Boulogne-Billancourt (FR)

(72) Inventor: Hideaki Setoguchi, Kanagawa (JP)

(73) Assignees: Nissan Motor Co., Ltd., Kanagawa (JP); Renault S.A.S., Boulogne-Billancourt (FR)

( * ) Notice: Subject to any disclaimer, the term of this patent is extended or adjusted under 35 U.S.C. 154(b) by 131 days.

(21) Appl. No.: 18/572,603

(22) PCT Filed: Jun. 23, 2021

(86) PCT No.: PCT/IB2021/000421
§ 371 (c)(1),
(2) Date: Dec. 20, 2023

(87) PCT Pub. No.: WO2022/269303
PCT Pub. Date: Dec. 29, 2022

(65) Prior Publication Data
US 2024/0278807 A1    Aug. 22, 2024

(51) Int. Cl.
*B60W 60/00* (2020.01)
*G06Q 10/02* (2012.01)
(Continued)

(52) U.S. Cl.
CPC .. *B60W 60/0021* (2020.02); *B60W 60/00253* (2020.02); *G06Q 10/02* (2013.01);
(Continued)

(58) Field of Classification Search
None
See application file for complete search history.

(56) References Cited

U.S. PATENT DOCUMENTS 11,188,741 B2*  11/2021  Kang ............... G06V 20/56
2017/0011629 A1*  1/2017  Lau ................. G08G 1/005
(Continued)

FOREIGN PATENT DOCUMENTS

CN    112633971 A    4/2021
JP    2019175403 A   10/2019
(Continued)

*Primary Examiner* — Hitesh Patel
*Assistant Examiner* — Wenyuan Yang
(74) *Attorney, Agent, or Firm* — Osha Bergman Watanabe & Burton LLP (57) ABSTRACT

A vehicle control device for controlling a vehicle is configured to stop in response to a request from a prospective passenger and allow the prospective passenger to board. The vehicle control device includes: a stop candidate location extraction unit configured to extract a candidate location for a stop location where the vehicle is to be stopped in order to allow the prospective passenger to board; a first movement time calculation unit configured to calculate a first movement time that is a time required for the prospective passenger to move to the candidate location; a second movement time calculation unit configured to calculate a second movement time that is a time required for the vehicle to move to the candidate location; a standby time calculation unit configured to calculate a standby time of the vehicle at the candidate location based on the first movement time and the second movement time; and a stop location determination unit configured to determine, when the standby time is equal to or shorter than a predetermined allowable stop time at the candidate location, the candidate location as the stop location.

16 Claims, 2 Drawing Sheets

(51) Int. Cl.
  *G06V 20/58* (2022.01)
  *G06V 40/10* (2022.01)
  *G06V 40/20* (2022.01)

(52) U.S. Cl.
  CPC .............. *G06V 20/58* (2022.01); *G06V 40/10* (2022.01); *G06V 40/20* (2022.01); *B60W 2420/403* (2013.01); *B60W 2540/041* (2020.02)

(56) References Cited

U.S. PATENT DOCUMENTS

| | | | |
|---|---|---|---|
| 2019/0079519 A1* | 3/2019 | Hwang | ................ G05D 1/0088 |
| 2019/0212738 A1 | 7/2019 | Umetani et al. | |
| 2022/0101633 A1 | 3/2022 | Nishiyama et al. | |

FOREIGN PATENT DOCUMENTS

| | | |
|---|---|---|
| WO | 2018189952 A1 | 10/2018 |
| WO | 2020/157531 A1 | 8/2020 |

\* cited by examiner

VEHICLE CONTROL DEVICE, VEHICLE CONTROL METHOD, VEHICLE CONTROL PROGRAM, AND VEHICLE CONTROL SYSTEM

TECHNICAL FIELD

The present invention relates to a vehicle control device, a vehicle control method, a vehicle control program, and a vehicle control system for controlling a vehicle that stops in response to a request from a prospective passenger and allows the prospective passenger to board.

BACKGROUND ART

WO 2018/189952 A1 discloses an autonomous driving vehicle in which, in a case where it is determined that there is no passenger in the vehicle, when a person making a predetermined gesture is detected, the autonomous driving vehicle stops near the person and allows the person to board.

SUMMARY OF INVENTION

In a vehicle dispatch service in the related art, a boarding point closest to a prospective passenger is designated, and a vehicle that can be boarded is dispatched to the boarding point.

On the other hand, in a taxi service using an autonomous driving vehicle, a service form is also studied in which a prospective passenger sends a predetermined sign indicating a boarding intention to a patrol autonomous driving vehicle to stop the autonomous driving vehicle and board the vehicle, similarly to a taxi service of a manned driving. In such a service form, in principle, it is desirable that the autonomous driving vehicle immediately stops near the prospective passenger and allows the prospective passenger to board.

However, due to laws, regulations, contracts, or the like, or due to other safety reasons or the like, there are cases where the autonomous driving vehicle cannot immediately stop near the prospective passenger. Therefore, when a prospective passenger tries to freely stop and board a patrol autonomous driving vehicle (a "cruising taxi" based on an autonomous driving vehicle), the autonomous driving vehicle needs to search for a place where the autonomous driving vehicle is safely stopped or parked without violating the laws or the like until the prospective passenger boards the vehicle.

An object of the present invention is to provide a vehicle control device, a vehicle control method, a vehicle control program, and a vehicle control system that enable a vehicle to search for a stop location where a prospective passenger can actually board the vehicle when the vehicle stops in response to a request from the prospective passenger and allows the prospective passenger to board.

One aspect of the invention is a vehicle control device for controlling a vehicle configured to stop in response to a request from a prospective passenger and allow the prospective passenger to board. The vehicle control device includes a stop candidate location extraction unit configured to extract a candidate location for a stop location where the vehicle is to be stopped in order to allow the prospective passenger to board; a first movement time calculation unit configured to calculate a first movement time that is a time required for the prospective passenger to move to the candidate location; a second movement time calculation unit configured to calculate a second movement time that is a time required for the vehicle to move to the candidate location; a standby time calculation unit configured to calculate a standby time of the vehicle at the candidate location based on the first movement time and the second movement time; and a stop location determination unit configured to determine, when the standby time is equal to or shorter than a predetermined allowable stop time at the candidate location, the candidate location as the stop location.

DESCRIPTION OF EMBODIMENTS

Hereinafter, an embodiment of the present invention will be described with reference to the drawings.

Figure 1:
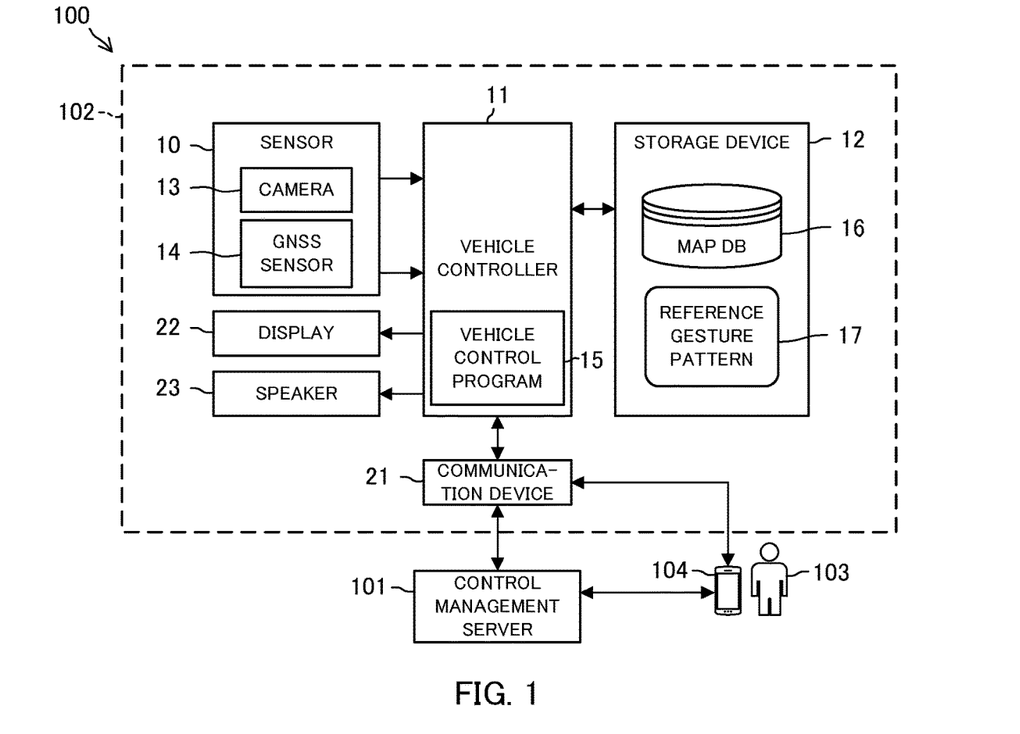
FIG. 1 is a block diagram showing a configuration of a vehicle control system.

FIG. 1 is a block diagram showing a configuration of a vehicle control system 100. The vehicle control system 100 is a system that uses one or more vehicles 102 controlled or managed by a control management server 101 to provide a vehicle dispatch service and/or a taxi service to a prospective passenger 103. In the present embodiment, the vehicle dispatch service means dispatching the vehicle 102 in response to an advanced request from the prospective passenger 103 and providing a transportation service using the vehicle 102. The taxi service refers to providing the transportation service using the vehicle 102 in response to an occasional request from the prospective passenger 103.

The control management server 101 is one or more computers that control or manage the vehicle 102 belonging to the vehicle control system 100 from an outside (a remote location) in order to provide the vehicle dispatch service and/or the taxi service.

For example, the control management server 101 receives a vehicle dispatch reservation or the like of the vehicle 102 from a device such as a smartphone 104 carried by the prospective passenger 103, and dispatches the vehicle 102 at a date and/or to a boarding point designated by the vehicle dispatch reservation. That is, the vehicle control system 100 provides the vehicle dispatch service in response to a request from the prospective passenger 103.

In addition, the control management server 101 causes the vehicle 102, a destination of which is not determined by a vehicle dispatch reservation or the like, to patrol along a predetermined route, for example. Accordingly, the vehicle control system 100 uses the vehicle 102 to provide a robot taxi service in response to an occasional request from the prospective passenger 103 who is present on the patrol route.

Hereinafter, in the present embodiment, a situation is assumed in which the vehicle control system 100 causes the vehicle 102 to patrol by using the control management server 101 and provides the robo taxi service in response to the occasional request from the prospective passenger 103.

The vehicle 102 is, for example, an autonomous driving vehicle that is automatically driven without being operated by a driver. Therefore, the taxi service provided by the vehicle control system 100 is generally the robo taxi service or a robot taxi service. Hereinafter, the taxi service provided by the vehicle control system 100 is the robo taxi service, and the vehicle 102 providing this service is a robo taxi. The vehicle 102 may be a vehicle driven by an operation of a driver, that is, a normal taxi vehicle.

The vehicle 102 includes a sensor 10, a vehicle controller 11, and a storage device 12.

The sensor 10 includes one or more devices such as a device that detects an operation state or the like of the vehicle 102, a device that detects a person or an object around the vehicle 102, and a device that detects a position or the like of the vehicle 102. The sensor 10 appropriately provides information detected by the various devices to the vehicle controller 11 as necessary.

The sensor 10 includes, for example, a device that detects a speed or a wheel speed, a steering angle, an acceleration or a deceleration, and/or a yaw rate, and the like as the device or the like that detects the operation state of the vehicle 102. The sensor 10 includes, for example, a camera 13, a light detection and ranging (LiDAR) scanner, a millimeter wave radar, a laser range finder, and/or a sonar as the device that detects the person or the object around the vehicle 102. In addition, the sensor 10 includes, for example, a global navigation satellite system (GNSS) sensor 14 such as a global positioning system (GPS) sensor, as the device that detects the position or the like of the vehicle 102.

Therefore, the vehicle controller 11 can appropriately acquire, using the sensor 10, information related to the operation state of the vehicle 102 (hereinafter, referred to as vehicle information), information related to a position, a size, a range, and the like of the person or the object around the vehicle 102, and position information such as a latitude and a longitude of a point where the vehicle 102 is located. The vehicle controller 11 may directly acquire these various types of information based on signals or the like output from these devices or the like included in the sensor 10, or may indirectly acquire these various types of information based on calculation or the like using the signals or the like output from the devices or the like included in the sensor 10.

In the present embodiment, the sensor 10 includes at least the camera 13 and the GNSS sensor 14. The camera 13 is an imaging device that captures an image of an outside of a vehicle, but the camera 13 may include an imaging device that captures an image of an inside of the vehicle.

The vehicle controller 11 is a vehicle control device that integrally controls an operation of the vehicle 102 and an operation of each unit of the vehicle 102. For example, the vehicle controller 11 can autonomously control driving of the vehicle 102 based on various types of information and the like that can be acquired from the sensor 10, without depending on an operation of a driver. In addition, the vehicle controller 11 can drive the vehicle 102 in accordance with an operation of a driver, and in this case, the vehicle controller 11 can assist driving of the vehicle 102 based on various types of information and the like that can be acquired from the sensor 10. In the present embodiment, the vehicle controller 11 autonomously controls the driving of the vehicle 102.

The vehicle controller 11 includes, for example, one or more computers and/or circuits. A vehicle control program 15 is installed in the vehicle controller 11, and the vehicle controller 11 controls the operations of the vehicle 102 and each unit constituting the vehicle 102 according to the vehicle control program 15. The vehicle control program 15 can be appropriately updated in part or in whole using a storage medium that stores the vehicle control program 15, or by an over the air (OTA) technology, for example. Here, the update includes correction, change, addition or deletion of functions and the like, or rollback to a previous version. When the vehicle controller 11 controls the operations of the vehicle 102 and each unit constituting the vehicle 102, the vehicle controller 11 refers to data and the like stored in the storage device 12, as necessary.

The storage device 12 temporarily or permanently stores data and the like necessary for controlling the operation of the vehicle 102 and/or each unit of the vehicle 102. In the present embodiment, the storage device 12 constitutes a map database (a map DB) 16. The storage device 12 stores a reference gesture pattern 17 in advance.

The map database 16 holds in advance a map related to roads and the like (hereinafter, simply referred to as a map) at least for a range in which the vehicle 102 can move for the vehicle dispatch service and the taxi service. The vehicle controller 11 controls autonomous driving of the vehicle 102 or provides driving assistance for a driver while referring to the map held by the map database 16 according to a position of the vehicle 102.

In the present embodiment, the map database 16 holds, in addition to the map, information on a place where the vehicle 102 can safely stop for the prospective passenger 103 to board without violating the laws or the like (hereinafter, referred to as a stoppable location). The information on the stoppable location is, for example, position information for specifying a position, a range, or the like of the stoppable location such as a latitude and a longitude or a facility name, and information on a time during which the vehicle 102 is allowed to stop at the stoppable location (hereinafter, referred to as an allowable stop time). The vehicle controller 11 extracts places as candidates for stopping the vehicle 102 (hereinafter, referred to as stop candidate locations) in order to allow the specific prospective passenger 103 to board, from one or more stoppable locations. The vehicle controller 11 determines a place where the vehicle 102 is actually stopped (hereinafter, referred to as a stop location) in order to allow the prospective passenger 103 to board, from the one or more stop candidate locations. A specific process executed by the vehicle controller 11 to determine the stop location as described above will be described in detail later. The stop candidate location of the vehicle 102 is a candidate for a place (a boarding candidate location) for boarding the vehicle 102 for the prospective passenger 103. The stop location of the vehicle 102 is a place (a boarding location) where the prospective passenger 103 boards the vehicle 102.

The stoppable location is, for example, a public place such as a taxi stand or a parking and stopping space provided on a road shoulder or the like. In addition, the stoppable location includes a place in a private place, which is a carriage porch, a parking lot, or the like of an accommodation facility, a commercial facility, or the like, and which is permitted to use from the facility or the like.

The allowable stop time at each stoppable location is determined in advance according to the laws or the like, or according to a contract with an owner or the like. For example, when there is a reservation for use of a specific stoppable location that is given priority over the use of the vehicle 102 according to a contract or the like, an actual allowable stop time may be shorter than a predetermined allowable stop time depending on the reservation for use and a timing at which the vehicle 102 stops. In addition, there is a stoppable location where a vehicle can substantially stop without limitation. Such information is held in the map database 16 in advance as the information on the stoppable location. Depending on a congestion degree of a stoppable location, there are cases where the stoppable location cannot be used temporarily.

The map, the position information on the stoppable location, and the information on the allowable stop time at each stoppable location held by the map database 16 are appropriately updated as necessary.

The reference gesture pattern 17 is a pattern which includes one or more gestures recognized by the vehicle 102 as a command or an indication of intention to the vehicle 102, and which serves as a determination reference in a gesture recognition process. The reference gesture pattern 17 is determined in advance according to a country, a region, or the like where the vehicle control system 100 provides the vehicle dispatch service and/or the taxi service.

For example, in Japan, a gesture of raising one hand toward the vehicle 102 with no passenger is a gesture indicating a boarding intention to the vehicle 102. Therefore, when the vehicle control system 100 provides the taxi service or the like in Japan, at least a gesture in which a person raises one hand toward the vehicle 102 is stored as at least one gesture of the reference gesture pattern 17.

In addition, for example, in Japan, a gesture of nodding to the vehicle 102 indicates an understanding of information provided by the vehicle 102, approval of a service provided by the vehicle 102, or the like. On the other hand, a gesture of shaking the head to the vehicle 102 indicates disagree with guided information or the like. Therefore, a gesture representing an indication of intention of the prospective passenger 103, such as the gesture of nodding to the vehicle 102 or the gesture of shaking the head to the vehicle 102, is stored as one gesture of the reference gesture pattern 17.

In the present embodiment, the patrol vehicle 102 recognizes a person making the gesture indicating the boarding intention, among persons detected by the sensor 10, as the prospective passenger 103 by referring to the reference gesture pattern 17.

The "gesture" includes a sign given by the prospective passenger 103 using his/her body, and transmission of a signal that functions as a command or an indication of intention to the vehicle 102 using the device such as the smartphone 104.

In addition, the vehicle 102 includes a communication device 21, a display 22, and a speaker 23.

The communication device 21 is an interface that is connected to the control management server 101 via a communication network (not shown) or directly, and transmits and receives data, other signals, or the like. The vehicle controller 11 can communicate with the device such as the smartphone 104 carried by the prospective passenger 103 using the communication device 21.

The display 22 and the speaker 23 constitute an information guidance device for providing a guidance of various types of information to the prospective passenger 103 who indicates the boarding intention outside the vehicle 102. In the present embodiment, the display 22 indicates the stop location of the vehicle 102 by displaying an image (including a moving image) or a message of the map or the like for the prospective passenger 103. The speaker 23 provides a guidance of the stop location of the vehicle 102, the display of the stop location of the vehicle 102 on the display 22, or the like, by emitting a sound or a voice to the prospective passenger 103.

Figure 2:
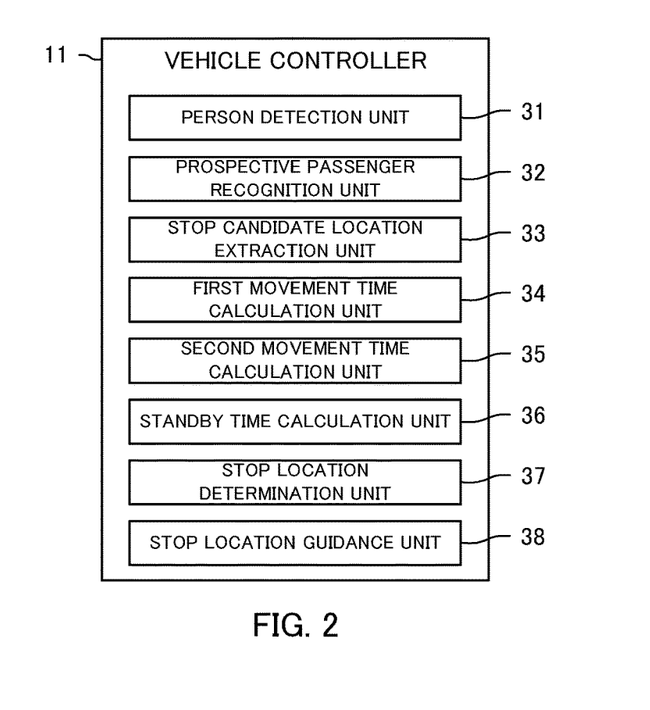
FIG. 2 is a block diagram showing functions of a vehicle controller.

FIG. 2 is a block diagram showing functions of the vehicle controller 11. As shown in FIG. 2, regarding the taxi service using the patrol vehicle 102, the vehicle controller 11 functions as a person detection unit 31, a prospective passenger recognition unit 32, a stop candidate location extraction unit 33, a first movement time calculation unit 34, a second movement time calculation unit 35, a standby time calculation unit 36, a stop location determination unit 37, and a stop location guidance unit 38.

The person detection unit 31 executes a person detection process. The person detection process is a process of detecting a person around the vehicle 102 using the sensor 10. That is, the person detection unit 31 detects the person including the prospective passenger 103. In the present embodiment, the person detection unit 31 detects the person from an image captured by the camera 13. In the person detection process, the person around the vehicle 102 is substantially continuously detected. Therefore, in the person detection process, not only the presence or absence of a person around the vehicle 102, but also features such as a face of the person, a position of the person, a movement of the person, and the like are detected. For example, when the person detected in the person detection process is moving, a direction, a speed, and the like of the movement are detected. In addition, when the person detected in the person detection process is making a gesture, the gesture is also detected.

The prospective passenger recognition unit 32 executes a prospective passenger recognition process. The prospective passenger recognition process is a process of, when a person is detected by the person detection unit 31, recognizing whether the person is the prospective passenger 103 based on a gesture, a pose, a sign, and/or other behaviors made by the person. That is, the prospective passenger recognition unit 32 recognizes the prospective passenger 103 from the detected person. Specifically, for example, when a person is detected around the vehicle 102 by the person detection process and the person is making a gesture, the prospective passenger recognition unit 32 performs pattern matching based on the reference gesture pattern 17. As a result of the pattern matching, when it is determined that the detected person is making the gesture indicating the boarding intention to the vehicle 102, the prospective passenger recognition unit 32 recognizes that the person is the prospective passenger 103.

The prospective passenger recognition unit 32 may recognize the prospective passenger 103 as a specific individual based on a face or other features of the recognized prospective passenger 103, as necessary. For example, the prospective passenger recognition unit 32 recognizes the prospective passenger 103 as a specific individual user by collating the detected face or the like of the prospective passenger 103 with a face or the like of a user registered in the control management server 101 by the pattern matching or the like. In addition, for example, the prospective passenger recognition unit 32 recognizes the prospective passenger 103 as the specific individual user by collating identification information on the smartphone 104 or the like in a range where it can be determined that the smartphone 104 or the like is carried by the recognized prospective passenger 103 with identification information on a user device registered in the control management server 101.

When the prospective passenger 103 is recognized as the specific individual, the prospective passenger recognition unit 32 acquires information on the prospective passenger 103 as necessary. The information on the prospective passenger 103 includes identification information for specifying an individual, settings according to a preference of the individual, and the like. For example, the information on the prospective passenger 103 includes a walking speed, a time required to move until boarding (hereinafter, referred to as a prospective passenger allowable movement time), and/or a distance required to move until boarding (hereinafter, referred to as a prospective passenger allowable movement distance), and the like of the prospective passenger 103. When the prospective passenger 103 is registered as an existing user, the information on the prospective passenger 103 is held in advance by the control management server 101, for example. The personal walking speed, the prospective passenger allowable movement time, and the prospective passenger allowable movement distance of the prospective passenger 103 are calculated in advance based on a boarding history, a cancellation history (a boarding intention removal history) in the past, and the like, or are determined in advance by setting registration by the prospective passenger 103.

When the prospective passenger 103 recognized by the prospective passenger recognition unit 32 is not (or cannot) recognized as the specific individual, the prospective passenger recognition unit 32 can acquire a general walking speed instead of the personal walking speed of the prospective passenger 103. The general walking speed is calculated or set based on, for example, boarding histories, cancellation histories, and the like of various prospective passengers in the past. The general walking speed may be a fixed value regardless of the boarding histories, the cancellation histories, and the like. The general walking speed is held in advance by the control management server 101, for example. The general walking speed may be determined in advance according to a physique, a gender, and the like of the prospective passenger 103.

The prospective passenger allowable movement time and the prospective passenger allowable movement distance are the same as the walking speed described above. That is, when the prospective passenger 103 recognized by the prospective passenger recognition unit 32 is not recognized as the specific individual, the prospective passenger recognition unit 32 can acquire a general prospective passenger allowable movement time and a general prospective passenger allowable movement distance, instead of the prospective passenger allowable movement time and the prospective passenger allowable movement distance related to the prospective passenger 103. The general prospective passenger allowable movement time and the general prospective passenger allowable movement distance are calculated or set based on, for example, the boarding histories, the cancellation histories, and the like of various prospective passengers 103 in the past, or set to respective fixed values. The general prospective passenger allowable movement time and the general prospective passenger allowable movement distance are held in advance in the control management server 101, for example. If necessary, the general prospective passenger allowable movement time and the general prospective passenger allowable movement distance are determined according to the physique, the gender, and the like of the prospective passenger 103.

When the prospective passenger recognition unit 32 recognizes the prospective passenger 103, the prospective passenger recognition unit 32 continuously recognizes at least a movement and/or a gesture of the prospective passenger 103. Accordingly, the prospective passenger recognition unit 32 recognizes approval for the stop location of the vehicle 102, removal of the boarding intention (an indication of intention of cancellation) indicated for the vehicle 102 by the prospective passenger 103, and the like.

For example, when the vehicle 102 guided a stop location, by detecting a gesture of the prospective passenger 103 of nodding to the vehicle 102, the prospective passenger recognition unit 32 recognizes that the prospective passenger 103 approves of boarding at the stop location. In addition, when the vehicle 102 guided a stop location, by detecting an operation in which the prospective passenger 103 starts walking toward the stop location, the prospective passenger recognition unit 32 recognizes that the prospective passenger 103 approves of boarding at the stop location.

On the other hand, when the vehicle 102 guided a stop location, by detecting a gesture of the prospective passenger 103 of shaking the head to the vehicle 102, the prospective passenger recognition unit 32 recognizes that an indication of intention is given that the prospective passenger 103 removals the boarding intention thereof, or does not agree with boarding at the guided stop location. In addition, when the vehicle 102 guided a stop location, there are cases where a movement that is expected not to be directed to the guided stop location is detected, such as a case where the prospective passenger 103 starts walking in a direction opposite to a direction in which the stop location is present, or a case where the prospective passenger 103 does not start moving even after a certain period of time elapses after the guidance. In this case, the prospective passenger recognition unit 32 recognizes that an indication of intention is given that the prospective passenger 103 removals the boarding intention thereof, or does not agree with boarding at the guided stop location.

The stop candidate location extraction unit 33 executes a stop candidate location extraction process. The stop candidate location extraction process is a process of extracting candidate locations (the stop candidate locations) with respect to the stop location at which the vehicle 102 is stopped in order to allow the prospective passenger 103 to board. More specifically, the stop candidate location extraction unit 33 refers to the map database 16 based on position information on the vehicle 102 and/or position information on the prospective passenger 103. Then, the stop candidate location extraction unit 33 extracts one or more stop candidate locations from the plurality of stoppable locations registered in the map database 16.

In the present embodiment, the stop candidate location extraction unit 33 extracts one stop candidate location through a two-stage process constituted by a first process and a second process described below.

The first process is a process of narrowing down (extracting) actually usable stoppable locations from the plurality of stoppable locations registered in the map database 16 in consideration of a position, a mobility, and the like of the prospective passenger 103. That is, in the first process, in the stoppable locations registered in the map database 16, a stoppable location extremely far from the prospective passenger 103 is excluded, and a stoppable location unsuitable for actual use is not extracted as a stop candidate location.

A reference for narrowing down the stoppable locations in the first process by the stop candidate location extraction unit 33 is a predetermined time or a predetermined distance (or a predetermined path). That is, when the predetermined time is used as a reference in the first process, the stoppable locations are narrowed down to a location where a time required for the prospective passenger 103 to move (hereinafter, referred to as a first movement time) is equal to or shorter than the predetermined time. In addition, when the distance is used as a reference in the first process, the stoppable locations are narrowed down such that a movement distance or a path (hereinafter, referred to as a first movement distance) of the prospective passenger 103 is equal to or less than the predetermined distance.

The predetermined time in the first process is, for example, the prospective passenger allowable movement time individually determined for the prospective passenger 103. That is, the predetermined time may be determined for each prospective passenger 103, and may be set to a maximum movement time that can be allowed by the specific prospective passenger 103. The predetermined time may be set to the general prospective passenger allowable movement time. That is, the predetermined time may be uniformly determined regardless of the individual specific prospective passengers 103, and may be set to a maximum movement time that can be allowed by a general prospective passenger.

The predetermined distance in the first process is, for example, the prospective passenger allowable movement distance individually determined for the prospective passenger 103. That is, the predetermined distance may be determined for each prospective passenger 103, and may be set to a maximum movement distance that can be allowed by the specific prospective passenger 103. The predetermined distance may be set to the general prospective passenger allowable movement distance. That is, the predetermined time serving as a reference for extracting the stop candidate location may be uniformly determined regardless of the individual specific prospective passengers 103, and may be set to a maximum movement distance that can be allowed by a general prospective passenger.

The second process is a process of extracting one specific stop candidate location from the stoppable locations narrowed down by the first process. That is, by the second process, one of one or more stoppable locations within an actually usable range is extracted as the stop candidate location.

The reference for extracting the stop candidate location in the second process is the movement time or the movement distance of the prospective passenger 103, or a movement time or a movement distance of the vehicle 102.

That is, when the prospective passenger 103 is used as a reference, the stop candidate location extraction unit 33 extracts a stoppable location having a shortest first movement time or a stoppable location having a shortest first movement distance as the one specific stop candidate location from the narrowed down stoppable locations. When the stop candidate location satisfies a condition related to a standby time to be described later, the stoppable location having the shortest first movement time or the stoppable location having the shortest first movement distance is determined as the stop location.

When the vehicle 102 is used as a reference, the stop candidate location extraction unit 33 extracts, as the one specific stop candidate location, a stoppable location at which the movement time of the vehicle 102 (hereinafter, referred to as a second movement time) is the shortest, or a stoppable location at which the distance or a path from the vehicle 102 (hereinafter, referred to as a second movement distance) is the shortest, from the narrowed down stoppable locations. When the stop candidate location satisfies the condition related to the standby time to be described later, the stop candidate location having the shortest second movement time or the stop candidate location having the shortest second movement distance is determined as the stop location. The second movement time is a time required for the vehicle 102 to arrive at the stop candidate location.

The first movement time calculation unit 34 executes a first movement time calculation process of calculating the first movement time, which is the movement time of the prospective passenger 103, for the stop candidate location. The first movement time is calculated based on a movement route from a current position of the prospective passenger 103 to the stop candidate location by walking or other methods, the walking speed of the prospective passenger 103, and the like.

The movement route of the prospective passenger 103 is determined by referring to the map database 16. In addition, a distance or a path of the movement route of the prospective passenger 103 is used to calculate the first movement time. When the movement route of the prospective passenger 103 is a route that requires a waiting time due to traffic lights or other additional required times, such as a route that crosses a road, an actual first movement time is calculated in consideration of this situation. The first movement time calculation unit 34 can roughly calculate the first movement time based on, for example, a linear distance from the current position of the prospective passenger 103 to the stop candidate location. In the present embodiment, the first movement time calculation unit 34 calculates the actual first movement time in consideration of the movement route of the prospective passenger 103.

When the prospective passenger 103 is registered as the existing user, the personal walking speed of the prospective passenger 103 is used to calculate the first movement time. When the prospective passenger 103 is unregistered, the general walking speed is used to calculate the first movement time.

The second movement time calculation unit 35 executes a second movement time calculation process of calculating the second movement time, which is the movement time of the vehicle 102, for the stop candidate location. The second movement time is calculated based on a traveling route from a current position of the vehicle 102 to the stop candidate location, a traveling speed of the vehicle 102, and the like.

The traveling route to the stop candidate location is determined by referring to the map database 16. The traveling speed of the vehicle 102 is roughly calculated in accordance with a legal speed on the traveling route, a congestion degree of the traveling route, and the like. The congestion degree is appropriately acquired from a public traffic information provider or the like as necessary. In the calculation of the second movement time, the waiting time according to the traffic lights or the like is also considered. That is, the second movement time calculation unit 35 calculates an actual second movement time at the time of calculation. However, the second movement time calculation unit 35 can roughly calculate the second movement time based on, for example, the current position of the vehicle 102 and a linear distance to the stop candidate location. In the present embodiment, the second movement time calculation unit 35 calculates the actual second movement time.

The standby time calculation unit 36 executes a standby time calculation process. The standby time calculation process is a process of calculating the standby time of the vehicle 102 at the stop candidate location based on the first movement time and the second movement time. Specifically, when the second movement time is equal to or shorter than the first movement time, a difference obtained by subtracting the second movement time from the first movement time is the standby time of the vehicle 102 at the stop candidate location. When the second movement time is longer than the first movement time, the standby time of the vehicle 102 at the stop candidate location is zero.

The stop location determination unit 37 executes a stop location determination process. The stop location determination process is a process of determining the stop candidate location as the stop location when the standby time is equal to or shorter than the predetermined allowable stop time at the stop candidate location.

Specifically, the stop location determination unit 37 acquires the allowable stop time of the stop candidate location by referring to the map database 16. On the other hand, the stop location determination unit 37 acquires the standby time of the vehicle 102 at the stop candidate location from the standby time calculation unit 36. The stop location determination unit 37 compares the stop allowable time with the standby time, and when the standby time is equal to or shorter than the allowable stop time, determines the stop candidate location as the stop location to be actually used. Of course, when the standby time at the stop candidate location is zero, the stop candidate location is determined as the stop location because the standby time is shorter than the allowable stop time.

On the other hand, in the stop location determination process, when it is determined that the standby time exceeds the allowable stop time, the vehicle controller 11 excludes the stop candidate location and extracts a stop candidate location again. In this case, a stoppable location close to the prospective passenger 103 and/or the vehicle 102 next to the first extracted stop candidate location becomes a new stop candidate location, and the above stop location determination process is executed. That is, the above various processes are repeatedly executed until the stop location is determined.

When comparing the allowable stop time with the standby time, the stop location determination unit 37 may correct the allowable stop time acquired from the map database 16 as necessary. For example, at the stop candidate location, there is a reservation for use by another vehicle or the like, and a time period related to the reservation for use and a time period in which the vehicle 102 is to be stopped in order to allow the prospective passenger 103 to board may overlap in whole or in part. In this case, even if the standby time is within the predetermined allowable stop time, the stop candidate location is actually unusable. Therefore, at the time of acquiring the allowable stop time at the stop candidate location, the stop location determination unit 37 also acquires the reservation for use of the stop candidate location, the congestion degree, or other information for restricting the use of the stop candidate location by the vehicle 102 (hereinafter, referred to as use restriction information). The stop location determination unit 37 corrects, based on the acquired use restriction information, the allowable stop time acquired from the map database 16, and uses the corrected allowable stop time for the comparison with the standby time.

The use restriction information is, for example, information published by a website or the like managed by an owner of the stop candidate location or another information provider, and the stop location determination unit 37 can acquire the use restriction information. The correction of the allowable stop time is, in principle, correction for reducing the allowable stop time in accordance with actual circumstances by reducing an unusable time from the allowable stop time. Therefore, the corrected allowable stop time is, in principle, equal to or shorter than the allowable stop time registered in the map database 16. However, for example, when the allowable stop time at the stop candidate location is temporarily or permanently extended by the owner of the stop candidate location or the like and the extended allowable stop time is not registered in the map database 16, the stop location determination unit 37 may extend the acquired allowable stop time.

The stop location guidance unit 38 executes a guidance process of guiding the prospective passenger 103 to the determined stop location. The guidance process is a process of providing a guidance (a notification) of information for specifying the stop location to the prospective passenger 103. The information for specifying the stop location is, for example, a position of the stop location, a route to the stop location, or a map indicating the position and the route, and/or a facility name to which the stop location belongs.

Specifically, the stop location guidance unit 38 provides the guidance of the information for specifying the stop location to the prospective passenger 103 by, for example, displaying on the display 22 and/or emitting the voice from the speaker 23. In this case, for example, the vehicle controller 11 reduces a speed of the vehicle 102 near the prospective passenger 103 such that the prospective passenger 103 can confirm the display on the display 22 or the voice emitted by the speaker 23. The stop location guidance unit 38 can provide the guidance of the information for specifying the stop location to the prospective passenger 103 by transmitting the information to the smartphone 104 or the like of the prospective passenger 103.

When the stop location guidance unit 38 guides the stop location to the prospective passenger 103, the vehicle controller 11 receives an indication of intention of approval or cancellation from the prospective passenger 103 through a gesture, an operation, an input from the smartphone 104 or the like, or the like. When the prospective passenger 103 approves of the stop location, the vehicle controller 11 moves the vehicle 102 to the approved stop location.

Hereinafter, an operation will be described in a case where the vehicle control system 100 configured as described above causes the occasional prospective passenger 103 who does not make the vehicle dispatch reservation or the like in advance to board the patrol vehicle 102 in the taxi service.

Figure 3:
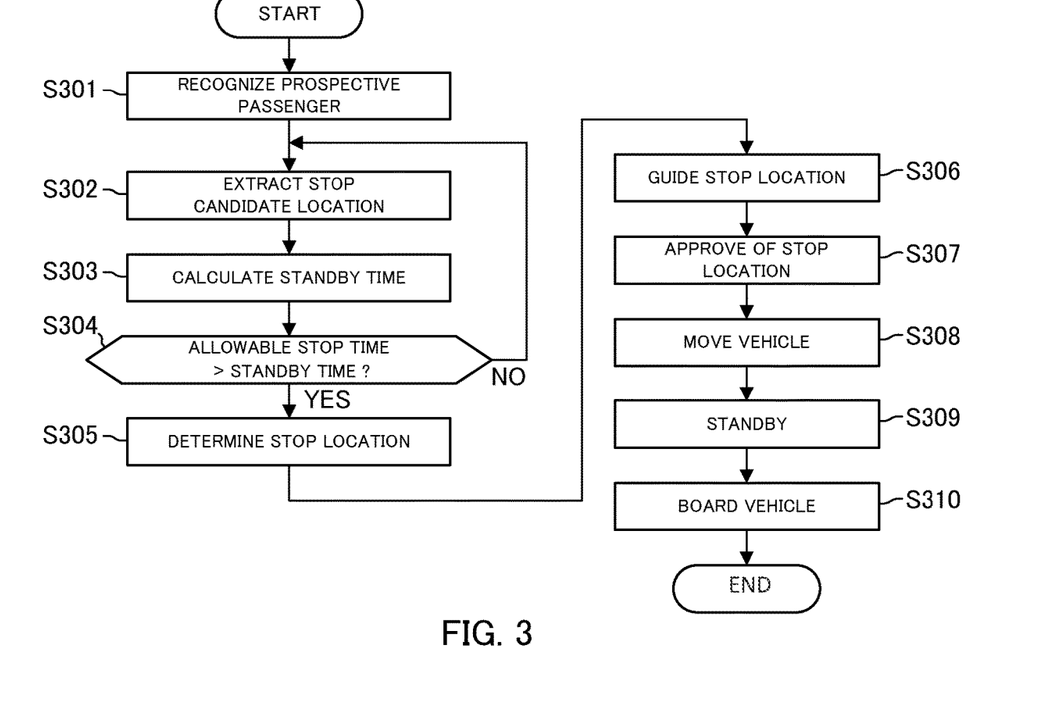
FIG. 3 is a flowchart showing an operation when a prospective passenger boards a vehicle.

FIG. 3 is a flowchart showing the operation when the prospective passenger 103 boards the vehicle. As shown in FIG. 3, when the patrol vehicle 102 recognizes the prospective passenger 103 indicating an boarding intention by a gesture or the like in step S301, the vehicle 102 extracts a stop candidate location for allowing the prospective passenger 103 to board in step S302. At this time, in principle, from actually usable stoppable locations, the stoppable location closest to the prospective passenger 103 and/or the vehicle 102 is selected as the stop candidate location.

When the stop candidate location is extracted, a standby time of the vehicle 102 at the stop candidate location is calculated in step S303. Specifically, a first movement time, which is a movement time of the prospective passenger 103, and a second movement time, which is a movement time of the vehicle 102, are calculated for the stop candidate location, and the standby time at the stop candidate location is calculated based on the first movement time and the second movement time.

Thereafter, in step S304, a predetermined allowable stop time at the extracted stop candidate location is compared with the standby time. Then, when the standby time is equal to or shorter than the allowable stop time, it is determined that the vehicle 102 can be safely stopped at the stop candidate location without violating the laws or the like until the prospective passenger 103 boards the vehicle. Therefore, in step S305, the extracted stop candidate location is determined as a stop location for actual boarding of the prospective passenger 103.

On the other hand, when the standby time exceeds the allowable stop time, it is expected that the vehicle 102 cannot be safely stopped in advance at the stop candidate location without violating the laws or the like until the prospective passenger 103 boards the vehicle. Therefore, another new stop candidate location is extracted excluding the stop candidate location, and for the new stop candidate location, a standby time is calculated in step S303, and the allowable stop time is compared with the standby time in step S304.

When the stop location is determined in step S305, in step S306, the stop location is guided to the prospective passenger 103 by, for example, displaying on the display 22. Then, when approval of the prospective passenger 103 is obtained for the stop location and boarding of the vehicle 102 at the stop location by a gesture or the like of the prospective passenger 103 in step S307, the vehicle 102 is moved to the stop location in step S308.

Thereafter, when the vehicle 102 arrives at the stop location, the vehicle 102 is on standby until the prospective passenger 103 arrives in step S309. Then, when the prospective passenger 103 arrives at the stop location, the prospective passenger 103 boards the vehicle 102 in step S310.

As described above, in the taxi service provided by the vehicle control system 100 according to the present embodiment, when the patrol vehicle 102 recognizes the prospective passenger 103, the patrol vehicle 102 searches for and determines by itself the stop location to stop for the prospective passenger 103 to board. In the taxi service, it is desirable that the vehicle 102 that recognizes the prospective passenger 103 immediately stops near the prospective passenger 103 and allows the prospective passenger 103 to board. However, due to laws, regulations, contracts, or the like, or due to other safety reasons or the like, the vehicle 102 is often unable to immediately stop near the prospective passenger 103. On the other hand, in the taxi service according to the vehicle control system 100, the stop location where the vehicle 102 can be safely stopped in advance without violating the laws or the like until the prospective passenger 103 arrives is searched for and determined by itself. Therefore, in the taxi service provided by the vehicle control system 100, the vehicle 102 can safely stop and wait for the prospective passenger 103 without violating the laws or the like at the stop location.

Figure 4:
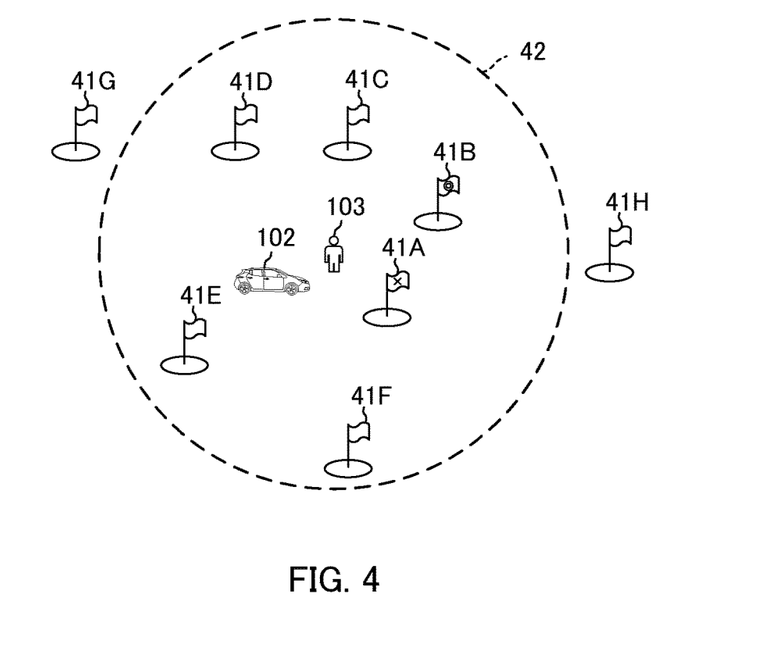
FIG. 4 is an explanatory diagram showing candidates for a stop location near the prospective passenger and the vehicle.

FIG. 4 is an explanatory diagram showing candidate locations for a stop location near the prospective passenger 103 and the vehicle 102. As shown in FIG. 4, more specifically, when the vehicle 102 recognizes the prospective passenger 103, it is assumed that, for example, eight stoppable locations 41A to 41H are present near the vehicle 102 and the prospective passenger 103. Then, as indicated by a broken line circle 42, it is assumed that, among the stoppable locations 41A to 41H, there are six stoppable locations 41A to 41F that are within a range where a first movement time is equal to or shorter than a predetermined time or a first movement distance is equal to or less than a predetermined distance, are actually close to the prospective passenger 103, and can be used as the stop location of the vehicle 102. Further, among the stoppable locations 41A to 41F, the stoppable location 41A is closest to the prospective passenger 103. Regarding the stoppable locations 41B to 41F, the stoppable locations 41B to 41F are located at positions close to the prospective passenger 103 in the order of the stoppable location 41B, the stoppable location 41C, the stoppable location 41D, the stoppable location 41E, and the stoppable location 41F.

At this time, the vehicle 102 first extracts, as the stop candidate location, the stoppable location 41A that is within the range of the broken line circle 42 and is closest to the prospective passenger 103. Then, a first movement time and a second movement time are calculated for the stoppable location 41A extracted as the stop candidate location, and a standby time TA (not shown) of the vehicle 102 when the stoppable location 41A is used as the stop location is calculated using the first movement time and the second movement time. Then, the standby time LA is compared with a predetermined allowable stop time TA (not shown) for the stoppable location 41A.

When the allowable stop time TA of the stoppable location 41A is shorter than the standby time TA, due to violation of the laws or the like or the safety reasons, the vehicle 102 cannot be stopped in advance at the stoppable location 41A until the prospective passenger 103 arrives. Therefore, the stoppable location 41A is temporarily the stop candidate location, but is not a final stop location (a boarding location), and the stoppable location 41B that is within the range of the broken line circle 42 and close to the prospective passenger 103 next to the stoppable location 41A is extracted as a next stop candidate location.

Then, in the same manner as in the case of the above stoppable location 41A, a standby time TB (not shown) is calculated for the stoppable location 41B which newly becomes a stop candidate location, and a value is compared with an allowable stop time TB (not shown) of the stoppable location 41B. As a result, when the standby time TB is shorter than the allowable stop time TB, the stoppable location 41B which is a new stop candidate location is determined as the final stop location (the boarding location).

Here, an example in which the stoppable location 41B satisfies the condition related to the standby time has been described, but when the stoppable location 41B does not satisfy the condition related to the standby time, the stoppable location 41C that is close to the prospective passenger 103 next to the stoppable location 41B becomes a new stop candidate location. After that, the processes are the same as described above.

Therefore, in the taxi service provided by the vehicle control system 100 according to the present embodiment, from a plurality of stoppable locations, a stoppable location close to the prospective passenger 103 is not simply used as an actual stop location (the boarding location), but a stoppable location where the vehicle 102 can be safely stopped in advance without violating the laws or the like as close as possible to the prospective passenger 103 is the actual stop location (the boarding location).

Modifications

In the above embodiment, the stop candidate location extraction unit 33 extracts one stop candidate location from a plurality of stoppable locations, but the present invention is not limited thereto, the stop candidate location extraction unit 33 can extract a plurality of stop candidate locations from a plurality of stoppable locations. For example, the stop candidate location extraction unit 33 can set, as the stop candidate locations, a plurality of stoppable locations which are all or a part of the plurality of stoppable locations narrowed down by the first process. In this case, the first movement time calculation unit 34 calculates a first movement time for each of the plurality of stop candidate locations. The second movement time calculation unit 35 calculates a second movement time for each stop candidate location. Therefore, the standby time calculation unit 36 also calculates a standby time of the vehicle 102 at each stop candidate location. Thereafter, the stop location determination unit 37 determines a stop location by comparing the standby time and an allowable stop time at each stop candidate location, as in the above embodiment. At this time, there may be a plurality of stop candidate locations having the standby time equal to or shorter than the allowable stop time. In this case, the stop location determination unit 37 can determine one stop candidate location based on the movement time or the movement distance of the prospective passenger 103 or the movement time or the movement distance of the vehicle 102, as in the second process executed by the stop candidate location extraction unit 33 in the above embodiment.

In the above embodiment, the stop location determination unit 37 determines one stop location, but the present invention is not limited thereto, and the stop location determination unit 37 can determine a plurality of stop candidate locations as stop locations. For example, when a plurality of stop candidate locations are extracted and there are multiple stop candidate locations having a standby time equal to or shorter than an allowable stop time as in the above modification, the plurality of stop candidate locations which are all or a part of the stop candidate locations can be determined as the stop locations. In this case, since there are multiple stop locations determined by the stop location determination unit 37, the stop location guidance unit 38 guides the multiple stop locations to the prospective passenger 103. The vehicle controller 11 receives an indication of intention related to selection of the stop location by the prospective passenger 103 through a gesture, an operation of the smartphone 104, or the like. Since the selection of the stop location by the prospective passenger 103 is synonymous with approval of the stop location in the above embodiment, the vehicle controller 11 sets one stop location as the stop location to be finally used according to the selection of the prospective passenger 103.

In the above embodiment, the prospective passenger recognition unit 32 recognizes features such as the face of the prospective passenger 103, the gesture, or the like, but the present invention is not limited thereto, and the prospective passenger recognition unit 32 can recognize the prospective passenger 103 based on an identification code of the smartphone 104 or the like, other signals, or the like.

In the above embodiment, the personal walking speed of the prospective passenger 103 is determined in advance, but the first movement time calculation unit 34 can correct the personal walking speed of the prospective passenger 103 and use the corrected speed for the calculation of the first movement time. For example, the first movement time calculation unit 34 can appropriately correct the predetermined walking speed of the prospective passenger 103 in accordance with a weather, an amount of luggage carried by the prospective passenger 103, and/or the presence or absence and a nature of a companion of the prospective passenger 103 (for example, there is a companion who is a child), or the like. In the above embodiment, the first movement time calculation unit 34 may calculate the first movement time using the general walking speed, but the first movement time calculation unit 34 can also appropriately correct the general walking speed in the same manner as described above.

In the above embodiment, the vehicle controller 11 executes the stop candidate location extraction process, the first movement time calculation process, the second movement time calculation process, the standby time calculation process, the stop location determination process, and the like. However, the vehicle controller 11 does not need to execute all of these processes, and the control management server 101 can execute all or a part of these processes. That is, the vehicle control system 100 can be implemented by the control management server 101 as a first device that executes any one or more of the various processes described above outside the vehicle 102, and the vehicle controller 11 as a second device that executes the remaining processes in the vehicle 102 in cooperation with the control management server 101. In this case, the same operation and effect as those of the above embodiment are also achieved. In this case, the entirety of a program that causes the control management server 101 to operate as the first device to execute any one or more of the various processes described above and a program that causes the vehicle controller 11 to execute the remaining processes in cooperation with the control management server 101 constitutes a vehicle control program.

As described above, the vehicle controller 11, which is the vehicle control device according to the present embodiment and/or the modifications (hereinafter, referred to as the present embodiment and the like), is a vehicle control device for controlling the vehicle 102 configured to stop in response to a request from the prospective passenger 103 and allow the prospective passenger 103 to board. The vehicle controller 11 includes: the stop candidate location extraction unit 33 configured to extract a candidate location (a stop candidate location) for a stop location where the vehicle 102 is to be stopped in order to allow the prospective passenger 103 to board; the first movement time calculation unit 34 configured to calculate a first movement time that is a time required for the prospective passenger 103 to move to the candidate location; the second movement time calculation unit 35 configured to calculate a second movement time that is a time required for the vehicle 102 to move to the candidate location; the standby time calculation unit 36 configured to calculate a standby time of the vehicle 102 at the candidate location based on the first movement time and the second movement time; and the stop location determination unit 37 configured to determine, when the standby time is equal to or shorter than a predetermined allowable stop time at the candidate location, the candidate location as the stop location.

According to the configuration, when the prospective passenger 103 is recognized, the vehicle control device according to the present embodiment and the like can search for by itself and use a stop location where the vehicle 102 can be safely stopped without violating laws or the like until the prospective passenger 103 boards the vehicle.

The vehicle controller 11, which is the vehicle control device according to the present embodiment and the like, further includes: the person detection unit 31 configured to detect a person including the prospective passenger 103; and the prospective passenger recognition unit 32 configured to recognize the prospective passenger 103 from the detected person based on a behavior of the person. According to the configuration, the vehicle control device according to the present embodiment and the like can recognize the occasional prospective passenger 103 having no advance reservation or the like and provide a taxi service by the patrol vehicle 102.

In the vehicle controller 11, which is the vehicle control device according to the present embodiment and the like, the stop candidate location is extracted such that the first movement time is equal to or shorter than a predetermined time. Accordingly, in the taxi service provided by the vehicle control system 100, a cancellation rate is reduced, and as a result, a vehicle dispatch efficiency is improved.

In particular, in the vehicle controller 11, which is the vehicle control device according to the present embodiment and the like, the above predetermined time may be determined for each prospective passenger 103, and may be set to a movement time allowed by the prospective passenger 103. In this way, when the above predetermined time is set, the stop location (a boarding location) is determined within a range that matches a personal request of the prospective passenger 103. As a result, in the taxi service provided by the vehicle control system 100, in particular, the cancellation rate is reduced, and the vehicle dispatch efficiency is improved.

In the vehicle controller 11, which is the vehicle control device according to the present embodiment and the like, the above predetermined time may be set to a movement time uniformly determined regardless of the individual prospective passenger 103. In this way, when the above predetermined time is set, it is easy to satisfy a potential request of the prospective passenger 103 related to the stop location (the boarding location). As a result, in the taxi service provided by the vehicle control system 100, in particular, the cancellation rate is reduced, and the vehicle dispatch efficiency is improved.

On the other hand, in the vehicle controller 11, which is the vehicle control device according to the present embodiment and the like, the stop candidate location is extracted such that a movement distance of the prospective passenger 103 is equal to or less than a predetermined distance. Accordingly, in the taxi service provided by the vehicle control system 100, the cancellation rate is reduced, and as a result, the vehicle dispatch efficiency is improved.

In particular, in the vehicle controller 11, which is the vehicle control device according to the present embodiment and the like, the above predetermined distance may be determined for each prospective passenger 103, and may be set to a movement distance allowed by the prospective passenger 103. In this way, when the above predetermined distance is set, the stop location (the boarding location) is determined within the range that matches the personal request of the prospective passenger 103. As a result, in the taxi service provided by the vehicle control system 100, in particular, the cancellation rate is reduced, and the vehicle dispatch efficiency is improved.

In the vehicle controller 11, which is the vehicle control device according to the present embodiment and the like, the above predetermined distance may be set to a movement distance uniformly determined regardless of the individual prospective passenger 103. In this way, when the above predetermined distance is set, it is easy to satisfy the potential request of the prospective passenger 103 related to the stop location (the boarding location). As a result, in the taxi service provided by the vehicle control system 100, in particular, the cancellation rate is reduced, and the vehicle dispatch efficiency is improved.

In the vehicle controller 11, which is the vehicle control device according to the present embodiment and the like, the allowable stop time is corrected based on a reservation for use of the stop candidate location. Therefore, the vehicle control device according to the present embodiment and the like can determine an appropriate stop location in accordance with the reality without extracting an unusable stop candidate location due to competition with other services or the like.

In the vehicle controller 11, which is the vehicle control device according to the present embodiment and the like, the allowable stop time is equal to or shorter than a time designated in advance by an owner of the stop candidate location. In this way, when the stop candidate location is a private place or the like and can be used as the stop location of the vehicle 102 based on a special contract, the contract can be reliably observed. As a result, in the taxi service provided by the vehicle control system 100, the private place or the like can be continuously used as the stop location of the vehicle 102. Accordingly, convenience of the prospective passenger 103 is also improved.

In the vehicle controller 11, which is the vehicle control device according to the present embodiment and the like, the stop location determination unit 37 can determine the stop candidate location having a shortest first movement time or the stop candidate location having a shortest distance from the prospective passenger 103 as the stop location under a condition that the standby time is equal to or shorter than the allowable stop time. Accordingly, a movement time and/or a movement distance of the occasional prospective passenger 103 can be minimized, and a taxi service with particularly high usability is provided. As a result, the cancellation rate is reduced, and the vehicle dispatch efficiency is improved.

In the vehicle controller 11, which is the vehicle control device according to the present embodiment and the like, the stop location determination unit 37 can determine the stop candidate location having a shortest second movement time or the stop candidate location having a shortest distance or path (second movement distance) from the vehicle 102 as the stop location under a condition that the standby time is equal to or shorter than the allowable stop time. Accordingly, a movement time and/or a movement distance of the vehicle 102 can be minimized. As a result, consumption of a fuel or a battery remaining amount for driving the vehicle 102, consumption of tires, and the like can be reduced, and a continuous taxi service period provided by the vehicle 102 can be extended. Therefore, according to the vehicle control device according to the present embodiment, the taxi service with particularly high usability is provided.

The vehicle controller 11, which is the vehicle control device according to the present embodiment, further includes a guidance unit (the stop location guidance unit 38) configured to guide the stop location where the standby time is equal to or shorter than the allowable stop time to the prospective passenger 103. The vehicle controller 11 moves the vehicle 102 to the stop location when the prospective passenger 103 approves of a guidance of the guidance unit. In this way, even when the occasional prospective passenger 103 is allowed to board, by dispatching the vehicle 102 based on the approval, it is easy for the prospective passenger 103 to understand that the vehicle 102 is to be stopped at a stop location at a position slightly away from the prospective passenger 103. In the taxi service provided by the vehicle control system 100, the cancellation rate is reduced, and the vehicle dispatch efficiency is improved.

Although the embodiment of the present invention has been described above, configurations described in the above embodiment and the modifications are only a part of application examples of the present invention, and are not intended to limit the technical scope of the present invention.

The invention claimed is:

1. A vehicle control device for controlling a vehicle configured to stop in response to a request from a prospective passenger and allow the prospective passenger to board, the vehicle control device comprising:
   a stop candidate location extraction unit configured to extract a candidate location for a stop location where the vehicle is to be stopped in order to allow the prospective passenger to board;
   a first movement time calculation unit configured to calculate a first movement time that is a time required for the prospective passenger to move to the candidate location;

a second movement time calculation unit configured to calculate a second movement time that is a time required for the vehicle to move to the candidate location;

a standby time calculation unit configured to calculate a standby time of the vehicle at the candidate location based on the first movement time and the second movement time;

a stop location determination unit configured to acquire a predetermined allowable stop time at the candidate location, which is a time during which the vehicle is allowed to stop at the candidate location, and determine, when the standby time is equal to or shorter than a predetermined allowable stop time, the candidate location as the stop location, and controlling the vehicle to stop at the determined stop location.

2. The vehicle control device according to claim 1, further comprising:

a person detection unit configured to detect a person including the prospective passenger; and a prospective passenger recognition unit configured to recognize the prospective passenger from the detected person based on a behavior of the person.

3. The vehicle control device according to claim 1, wherein the candidate location is extracted such that the first movement time is equal to or shorter than a predetermined time.

4. The vehicle control device according to claim 3, wherein the predetermined time is determined for each prospective passenger, and is a movement time allowed by the prospective passenger.

5. The vehicle control device according to claim 3, wherein the predetermined time is a movement time uniformly determined regardless of an individual prospective passenger.

6. The vehicle control device according to claim 1, wherein the candidate location is extracted such that a movement distance of the prospective passenger is equal to or less than a predetermined distance.

7. The vehicle control device according to claim 6, wherein the predetermined distance is determined for each prospective passenger, and is a movement distance allowed by the prospective passenger.

8. The vehicle control device according to claim 6, wherein the predetermined distance is a movement distance uniformly determined regardless of an individual prospective passenger.

9. The vehicle control device according to claim 1, wherein the allowable stop time is corrected based on a reservation for use of the candidate location.

10. The vehicle control device according to claim 1, wherein the allowable stop time is equal to or shorter than a time designated in advance by an owner of the candidate location.

11. The vehicle control device according to claim 1, wherein the stop location determination unit determines the candidate location having a shortest first movement time or the candidate location having a shortest distance from the prospective passenger as the stop location under a condition that the standby time is equal to or shorter than the allowable stop time.

12. The vehicle control device according to claim 1, wherein the stop location determination unit determines the candidate location having a shortest second movement time or the candidate location having a shortest distance from the vehicle as the stop location under a condition that the standby time is equal to or shorter than the allowable stop time.

13. The vehicle control device according to claim 1, further comprising:

a guidance unit configured to guide the stop location, where the standby time is equal to or shorter than the allowable stop time, to the prospective passenger, wherein the vehicle is moved to the stop location when the prospective passenger approves of a guidance of the guidance unit.

14. A vehicle control method for controlling a vehicle configured to stop in response to a request from a prospective passenger and allow the prospective passenger to board, the vehicle control method comprising:

by a vehicle control device configured to control the vehicle extracting a candidate location for a stop location where the vehicle is to be stopped in order to allow the prospective passenger to board;

calculating a first movement time that is a time required for the prospective passenger to move to the candidate location;

calculating a second movement time that is a time required for the vehicle to move to the candidate location;

calculating a standby time of the vehicle at the candidate location based on the first movement time and the second movement time;

acquiring a predetermined allowable stop time at the candidate location, which is a time during which the vehicle is allowed to stop at the candidate location, and determining the candidate location as the stop location when the standby time is equal to or shorter than a predetermined allowable stop time, and controlling the vehicle to stop at the determined stop location.

15. A vehicle control program for controlling a vehicle configured to stop in response to a request from a prospective passenger and allow the prospective passenger to board, the vehicle control program causing a vehicle control device configured to control the vehicle to function as:

a stop candidate location extraction unit configured to extract a candidate location for a stop location where the vehicle is to be stopped in order to allow the prospective passenger to board, a first movement time calculation unit configured to calculate a first movement time that is a time required for the prospective passenger to move to the candidate location, a second movement time calculation unit configured to calculate a second movement time that is a time required for the vehicle to move to the candidate location, a standby time calculation unit configured to calculate a standby time of the vehicle at the candidate location based on the first movement time and the second movement time, a stop location determination unit configured to acquire a predetermined allowable stop time at the candidate location, which is a time during which the vehicle is allowed to stop at the candidate location, and determine, when the standby time is equal to or shorter than a predetermined allowable stop time, the candidate location as the stop location, and wherein the vehicle control device controls the vehicle to stop at the determined stop location.

16. A vehicle control system for controlling a vehicle configured to stop in response to a request from a prospective passenger and allow the prospective passenger to board, the vehicle control system comprising:
- a first device configured to execute any one or more of a stop candidate location extraction process of extracting a candidate location for a stop location where the vehicle is to be stopped in order to allow the prospective passenger to board, a first movement time calculation process of calculating a first movement time that is a time required for the prospective passenger to move to the candidate location, a second movement time calculation process of calculating a second movement time that is a time required for the vehicle to move to the candidate location, a standby time calculation process of calculating a standby time of the vehicle at the candidate location based on the first movement time and the second movement time, and a stop location determination process of acquiring a predetermined allowable stop time at the candidate location, which is a time during which the vehicle is allowed to stop at the candidate location, and determining the candidate location as the stop location when the standby time is equal to or shorter than a predetermined allowable stop time; and
- a second device configured to execute, when the first device executes a part of the stop candidate location extraction process, the first movement time calculation process, the standby time calculation process, and the stop location determination process, remaining processes in cooperation with the first device, wherein the second device controls the vehicle to stop at the determined stop location.

* * * * *